United States Patent
Chausse et al.

[15] 3,671,831
[45] June 20, 1972

[54] INDUCTION MOTOR SPEED CONTROL

[72] Inventors: Burnette P. Chausse; Charles E. Konrad, both of Roanoke, Va.

[73] Assignee: General Electric Company

[22] Filed: March 5, 1971

[21] Appl. No.: 121,256

[52] U.S. Cl. .................................................. 318/227
[51] Int. Cl. .................................................. H02p 5/40
[58] Field of Search ........................ 318/227, 230, 231

[56] References Cited

UNITED STATES PATENTS

| | | | |
|---|---|---|---|
| 3,372,323 | 3/1968 | Guyeska | 318/230 |
| 3,500,158 | 3/1970 | Landau | 318/227 |
| 3,529,223 | 9/1970 | Vergez | 318/227 |
| 3,584,279 | 6/1971 | Krauthamer | 318/231 |
| 3,594,623 | 7/1971 | Lamaster | 318/227 |

Primary Examiner—Bernard A. Gilheany
Assistant Examiner—Thomas Langer
Attorney—Arnold E. Renner, James C. Davis, Jr., Frank L. Neuhauser, Oscar B. Waddell and Joseph B. Forman

[57] ABSTRACT

A control circuit for regulating the speed of a polyphase induction motor by changing the frequency and voltage level of the supply source supplying power to the motor. The difference between a speed reference signal and an output signal from a closed loop feedback circuit is converted to a sine wave alternating current signal having a frequency which varies with the time integral of the difference. A circuit for amplifying this alternating current signal provides power to the induction motor. A pair of diodes connected in the feedback circuit limits the rate of change of the frequency of the alternating current signal to a value determined by the design of the motor. The voltage amplitude of the alternating current supplied to the motor is adjusted as a function of the frequency and is further adjusted as a function of slip of the motor. Additional adjustment of the volts/cycle/second value of the alternating current supplied to the motor allows for overexcitation of the motor even beyond the design limits of the motor in order to provide the greatest possible torque to maximize the rate of change in speed and direction of the motor.

6 Claims, 5 Drawing Figures

INVENTORS.
BURNETTE P. CHAUSSE
CHARLES E. KONRAD 3,671,831

INDUCTION MOTOR SPEED CONTROL

BACKGROUND OF THE INVENTION

The squirrel-cage induction motor outnumbers all electrical motors in service today. The principle reason for this popularity is the simplicity, ruggedness and reliability inherent in this type of motor. However, since the induction motor is basically a constant speed machine when operated from a fixed frequency power source, it is not widely accepted for variable speed applications and its use in large, reversing drives such as those required in steel mills is practically nonexistent. These types of applications have required the use of direct current motors having commutators or synchronous type machines with slip rings. Commutators, slip rings, trolleys and other flexible means of conduction of electrical energy are subject to wear, arcing and as a consequence require frequent inspection and maintenance.

The growth of silicon technology has continually reduced the cost of power semiconductors and has now reached the point where inverters and cycloconverters provide an economical means for converting the fixed frequency of a polyphase power distribution system into a variable frequency for use with induction motors. The cost of the combination of motor and converter has become competitive with the direct current system and offers the advantages of the rugged design of the squirrel-cage type motor requiring no slip rings or commutators. An important link in a drive system of this type is a regulator which provides for maximum performance of the overall drive without sacrificing reliability.

SUMMARY OF THE INVENTION

In order to provide a regulator which exhibits maximum performance of a drive system without sacrificing the reliability, the present invention provides means for reliable speed regulation of an induction motor supplied by a polyphase AC source.

In the invention an input signal proportional to the desired speed of the motor is algebraically added to a feedback signal representing actual speed of the motor. The resultant algebraic sum is applied to an integrator circuit which produces an output voltage signal proportional to the time integral of the algebraic sum of the other two signals.

Circuitry receiving this voltage signal produces a periodic waveform signal, the frequency of which is proportional to the integrator circuit output, which, when applied to the appropriate amplification circuitry, provides a variable frequency polyphase alternating current suitable for application to a polyphase induction motor.

A first object of the invention is to provide means for limiting the rate of change of frequency of the alternating current in order to limit the maximum rate of change of torque in the motor.

Another object of the invention is to provide means for maintaining an amplitude of the alternating voltage applied to the motor at a predetermined value as a function of the integrator output signal in order to produce a constant flux level in the motor.

A further object of the invention is to provide means for limiting the difference in speed between the rotating magnetic field of the motor and the speed of the rotor to a predetermined absolute value.

Yet another object of the invention is to provide means for overexcitation of the motor for short intervals of time whereby speed changes of the motor may be accomplished at a maximum allowable rate.

DETAILED DESCRIPTION

Figure 1:
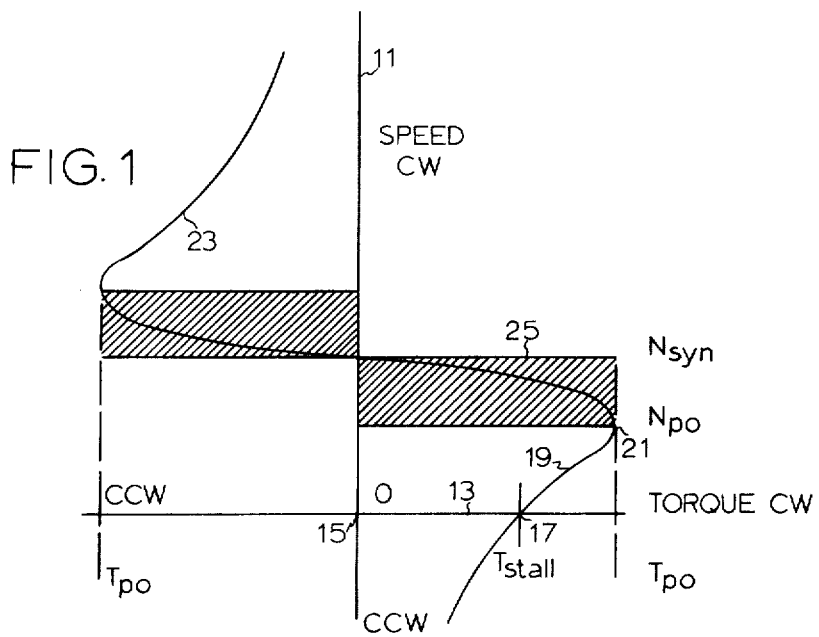
FIG. 1 shows a typical torque-speed curve of an induction motor.

In FIG. 1 the basic speed-torque characteristics of a typical polyphase induction motor are graphically presented. The induction motor is supplied from a polyphase power source having a constant voltage and a constant frequency. Speed values are plotted along the ordinate or vertical axis 11, while torque values are represented by values along the abscissa or horizontal axis 13 of the graph. The abscissa 13 and the ordinate 11 intersect at a point 15, representing zero value for both the speed and the torque of the motor. Speed values above the abscissa are considered to be positive or clockwise (CW). Speed values below the abscissa are considered to be negative or counterclockwise (CCW). Similarly, torque values to the right of ordinate 11 are considered positive or clockwise (CW) and torque values to the left of the ordinate are negative or counterclockwise (CCW).

With convention thus defined, attention is directed to other significant coordinates of the graph. Consider first, motor speed at zero. Should motor power be suddenly applied at zero speed, a torque $T_{stall}$ will develop, represented by point 17 on the abscissa 13. As the motor accelerates, the value of the torque developed by the motor increases in accordance with values represented by curve 19 until a maximum value termed "pullout torque" ($T_{po}$) at point 21 on curve 19 is reached. The speed of the motor at this point is termed "pullout speed" ($N_{po}$).

If the motor is running without load, its speed will continue to increase to a point close to the synchronous speed ($N_{syn}$). The torque will, however, decrease during the increase in speed. A minimal value of torque is, however, necessary in order to overcome the residual windage and friction of the motor.

Consider now the effect of a load torque applied to the motor and the several obvious limitations which must be imposed. First, if the load requires a torque which exceeds the value of the stall torque ($T_{stall}$ — at point 17 on the graph), the motor will never start to rotate. Secondly, with a load torque which is less than the stall torque ($T_{stall}$) motor acceleration will occur in accordance to the values represented by curve 19 on the graph. Motor speed will stabilize at a point above the pullout speed ($N_{po}$) where the developed torque of the motor is equal to the load torque. This point is located somewhere between synchronous speed ($N_{syn}$) and pullout speed ($N_{po}$).

Consider now the condition where the motor is driving a load at a speed somewhere between the synchronous speed ($N_{syn}$) and the pullout speed ($N_{po}$). If the load torque is now increased, the speed of the motor will decrease achieving values represented by curve 19 as the speed decreases. With increasing load torque, the speed of the motor decreases to a value where the load torque is in excess of the pullout torque (at point 21 on the graph). At this point, the system collapses and the motor stalls. The load then causes the rotation of the motor to reverse and speed to increase in the negative or counterclockwise direction in spite of the positive or clockwise torque developed by the motor. This is represented by curve 19 in the fourth quadrant of the graph. The above describes the conditions encountered when the motor drives the load in the clockwise or positive direction.

The second quadrant shows a regenerative braking condition of a motor. Under this condition, the torque of the motor is in the negative or counterclockwise direction and speed is in the positive direction. In other words, the load torque and the motor torque are in the same direction. The graph shows that, should the load torque exceed the pullout torque of the motor, the system loses control since the motor cannot develop enough torque to regain control over its speed. Speed-torque values of the motor under the regenerative braking conditions are represented by curve 23 in the graph.

The correct operation of an induction motor must, therefore, result from maintaining the speed of the motor within the limits determined by the synchronous speed ($N_{syn}$) and the pullout speed ($N_{po}$) and within torque limits ranging from close to zero torque and pullout torque ($T_{po}$). The above limits are represented by a box 25 shown in FIG. 1.

It is noted that the synchronous speed of a given induction motor is a direct function of the applied frequency of the alternating current supplying the motor.

In order to describe fully the behavior of an induction motor under the influence of a variable frequency power input, two important criteria need be established. First, it is necessary for the applied voltage to vary directly with the frequency of the power source in order to maintain a constant magnetic flux level in the motor. Secondly, the relationship of torque and speed is based upon the difference in the speed between the armature of the motor and the rotating magnetic field produced in the stator of the motor.

Figure 2:
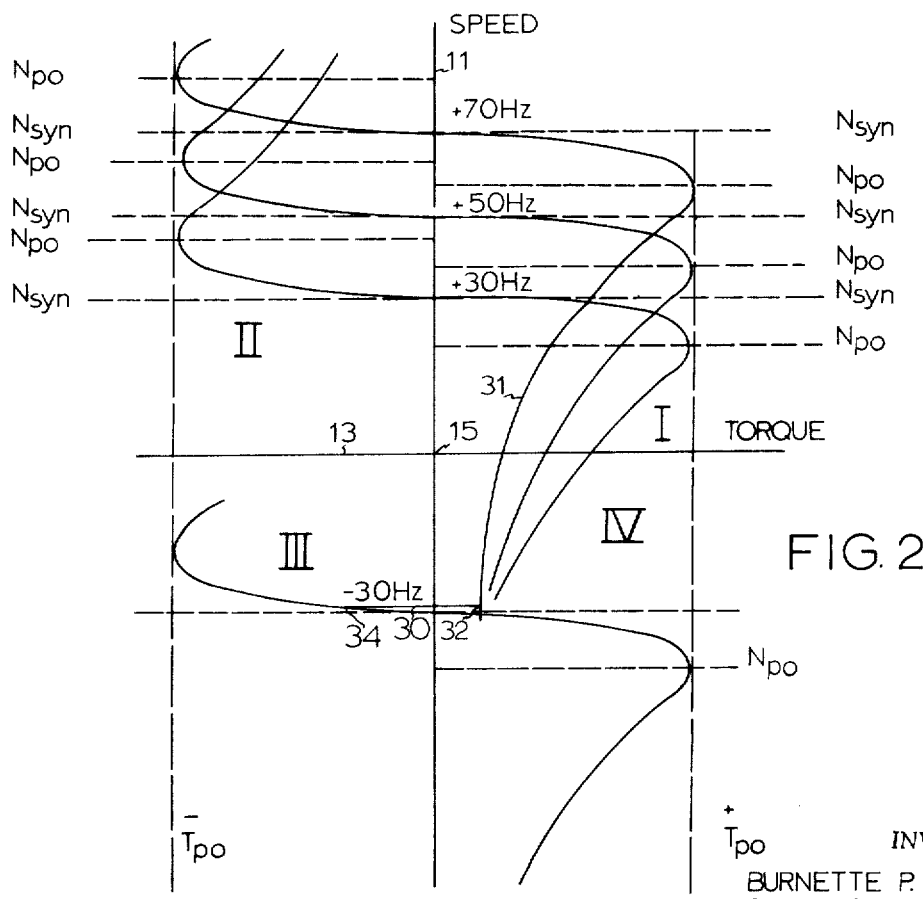
FIG. 2 shows speed-torque curves of an induction motor at various frequencies.

Referring now to FIG. 2, several speed-torque curves of an induction motor are presented, each curve representing conditions at a different frequency. As in FIG. 1, speed values of the motor are presented along the ordinate 11 while values of torque developed in the motor are presented along the abscissa 13; and similarly, the values of both torque and speed are zero at the intersection 15 of the abscissa 13 and the ordinate 11. The polarity of the motor torque and speed of the motor is identical to those described in FIG. 1 with respect to the abscissa 13 and the ordinate 11. Thus, in the first quadrant both torque and speed of the motor are positive or clockwise. In the second quadrant, speed is positive while motor torque is negative. The third quadrant presents a negative or counterclockwise direction for both torque and motor speed, and in the fourth quadrant motor torque is positive while speed is negative.

Since the polarity of the speed (i.e., direction of rotation) is a function of the polarity of the rotating field of the motor, and this, in turn, is a function of the phase sequence of the polyphase alternating current applied to the motor, the frequency (determining the synchronous speed of the motor) of the alternating current source supplying the motor is expressed in terms of positive and negative values for the purpose of explanation.

Thus, in FIG. 2, for example, an alternating current source is supplying power to an induction motor at −30 Hz, an indication that the motor synchronous speed is negative or counterclockwise and determined by the frequency of 30 Hz. The motor, therefore, is driving a load in the counterclockwise direction as indicated by curve 30. Assume now that the load is very small so that the torque developed by the motor approaches zero. If, now, for example, the motor is first decelerated and then accelerated to a speed equivalent to +70 Hz synchronous speed in the opposite direction, the motor must first develop positive torque to provide a decelerating force in order to overcome its inertia and stop. For purpose of explanation, it may be assumed that the reversal of the power applied to the motor is instantaneous. System inertia prohibits an instantaneous change in speed; hence, the operating point transfers instantaneously to point 32 of the +70 Hz curve 71 at the constant speed. Torque instantly transfers from a negative value at point 34 to a positive value at point 32 on the graph. The torque developed by the motor at this point is very small. Speed is still in the negative direction until curve 31 intersects the abscissa 13 at which point speed is zero (the motor is at standstill). From here on, speed of the motor is in the clockwise direction as is the torque developed in the motor.

During an instant reversal as described above, the current developed in the motor is very high, possibly four to six times the rated current of the motor. This high current could possibly damage the motor; hence, means must be provided in the regulation of the motor to overcome such a condition. The regulator used for controlling the speed and direction of rotation of the motor must include means for "tracking" the speed of the motor and the frequency of the alternating current source (synchronous speed of the motor) together. Thus, in the example where the frequency and the resulting synchronous speed of the motor is changed for −30 Hz to +70 Hz, it is necessary that the rate of change of the synchronous speed of the motor is maintained at a value which limits the difference between the synchronous speed and actual speed of the motor at any particular instant during the speed change. Thus, as in FIG. 1, operation of the motor must be such that the speed-torque values of the motor during a change in speed remain within a box equivalent to box 25, speed limited vertically by synchronous speed, $N_{syn}$, at the top and pullout speed, $N_{po}$, at the bottom, and limited horizontally by zero torque on the left-hand side and pullout torque, $T_{po}$, on the right-hand side. During the speed change and direction change of the motor, described above, this speed-torque box may be considered to slide vertically from − 30 Hz to +70 Hz at a rate which will maintain the speed-torque values developed in the motor at values which are within the boundaries of the box at all times. Similarly, if, for example, the motor is driving a load at a speed which corresponds to +70 Hz synchronous speed and is decelerated to a speed which corresponds to +50 Hz synchronous speed, the rate of change in frequency causing the deceleration must be such that the speed-torque values developed by the motor are retained within the limits, outlined by the box, while the box is considered to move to the lower frequency. The regulator controlling the speed of the motor must, therefore, provide a means whereby the change in frequency of the source is limited to a rate which allows the motor to develop the maximum possible torque, $T_{po}$, without exceeding the limits represented by the box.

The maximum torque value of a motor is a function of its design and is a predetermined specified value, based upon the magnetic flux level in the motor. The magnetic flux level is a direct function of the voltage applied to the motor at a predetermined frequency. Thus, when an induction motor is designed for operation from a source of 60 Hz at 40 volts, the magnitude of the pullout torque is thereby clearly defined. It follows then that, if there exists a capability of varying the voltage applied to the motor at any frequency, the pullout torque may be adjusted from very low values to a value which is hereinafter referred to as magnetic saturation of the motor. Saturation of the motor is approached when the magnitude and frequency of the voltage applied to the motor are at a level for which the motor is designed. The cycloconverter control, or variable frequency regulator, described herein, provides the possibility of overexciting the motor. That is, the regulator has the capability of driving the flux point of the motor to a level which is higher than that for which the motor was originally designed. Since magnetic saturation of an induction motor is not a "sharp value" but is somewhat flexible over a predetermined range, a reasonable increase in the flux level of the motor is possible. This concept implies that larger peak torque values may be achieved from an induction motor on a transient basis by overexciting the motor for short periods of time. This characteristic, as well as the sliding or moving box concept of changing the frequency from one level to another, has been incorporated in the regulator.

Figure 3:
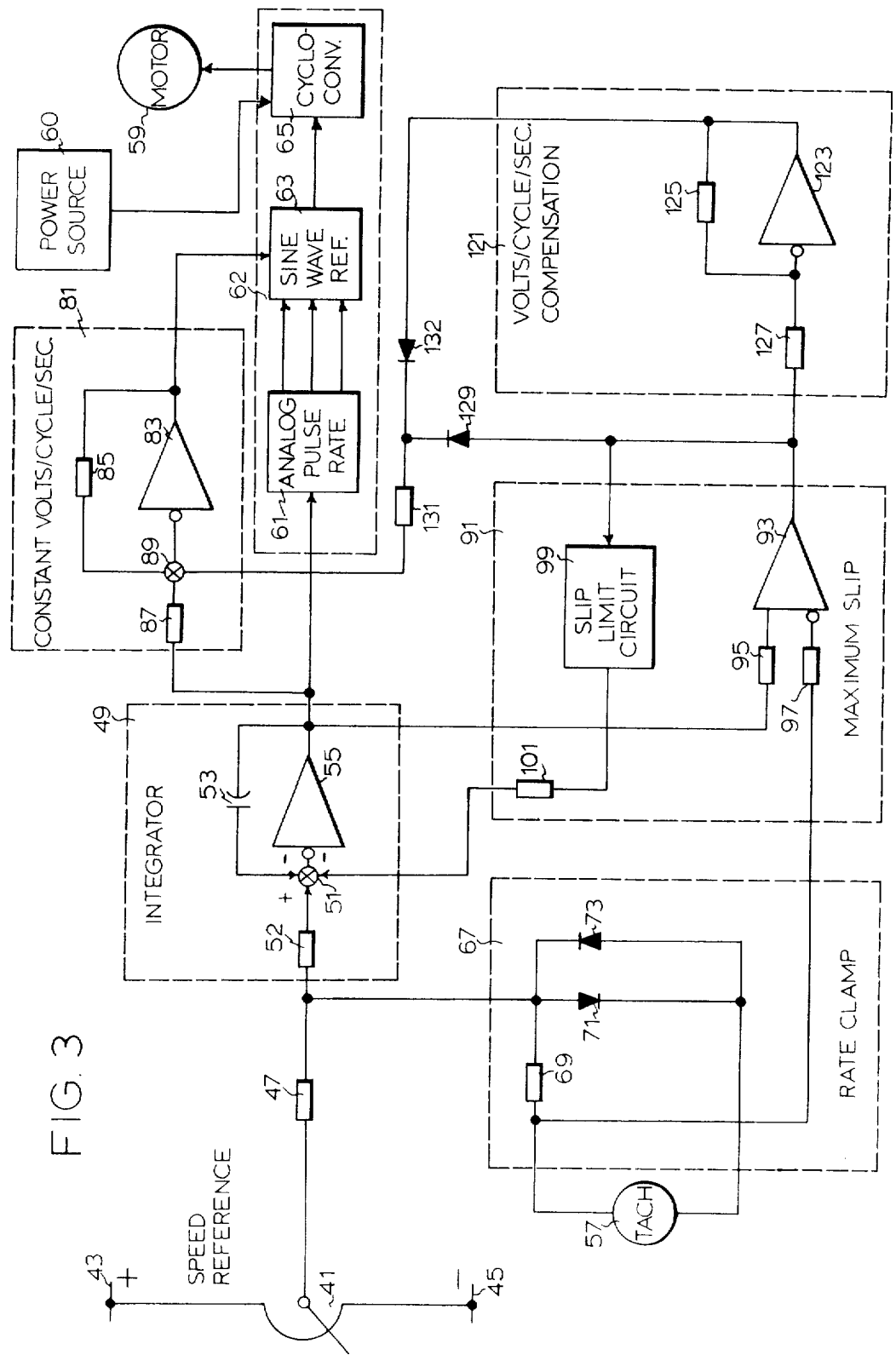
FIG. 3 is the schematic representation of an induction motor speed regulator.

Referring now to FIG. 3, a speed reference source represented by a potentiometer 41 is connected between a positive bus 43 and a negative bus 45. The potentiometer 41 has the capability of applying a voltage signal to a resistor 47 which is either positive or negative in polarity and which may attain a level approaching the value of the positive or the negative bus 43 and 45, respectively. The resistor 47 is connected to the input of an integrator 49 comprising a resistor 52, a capacitor 53, an amplifier 55 and a summing junction 51. In theory an integrator produces an output signal which is the time integral of its input. In practice, however, the output signal is influenced by the losses and variations resulting from manufacturing tolerances of the components involved in its construction. Thus, due to leakage in the capacitor 53, the output signal of the integrator 49 resembles to a minor degree the output signal of a low pass amplifier having high gain. This type of amplifier is similar to the integrator 49 except it further includes a resistance connected in parallel with capacitor 53 whereby sensitivity to the higher frequencies is approximately equal to the sensitivity of an integrator. However, in the lower frequency range, sensitivity is much reduced. It is, therefore, possible to substitute for the integrator 49 a low pass amplifier with high gain and thus modify the output signal in the low frequency range with respect to the output signal of the integrator.

For purposes of explanation, the word "integrator" is used; however, the intent is hereby indicated to include amplifiers of the type described above which produce output signals in proportion to their input signals acted thereupon for a period of time.

The speed reference signal applied to the integrator 49 is a voltage signal, the polarity of which determines the desired rotational direction of the motor and the voltage level of which determines the operating speed at which the motor is to run. This speed reference signal is compared to a voltage output signal (a speed feedback signal) of a tachometer 57 which is mechanically coupled to a shaft of a drive motor 59. If a difference exists between the voltage levels of the two signals, one representing the desired speed and the other representing the actual operating speed, a voltage signal results which is applied to the integrator 49. The integrator 49 provides an output signal which will continue to change in either the positive direction or the negative direction, depending on the polarity of voltage signal resulting from the combination of the reference signal and the feedback signal from the tachometer 57.

The output of the integrator is fed to a regulator interface circuit 62 wherein the output signal of the integrator is modified to form the input power to the motor. In the example shown, the interface circuit includes an analog to pulse rate circuit 61, the operation of which is fully described in a copending application Ser. No. 556, filed Jan. 5, 1970 (Cycloconverter Interface Apparatus by C. E. Konrad et al.). Briefly, this circuit produces a pulse train, the rate of which is proportional to the voltage level applied to its input. The pulse train resulting from this circuit 61 is applied to a sine wave reference circuit 63 fully described in copending application Ser. No. 861,840, filed Sept. 29, 1969 (Frequency Polyphase Power Supply by C. E. Konrad et al.). The sine wave reference circuit 63 produces a polyphase alternating current output signal which is applied to a cycloconverter circuit 65. The pulse rate of the pulse train output of the analog to pulse rate circuit 61 ultimately determines the frequency of the alternating current output which, of course, determines the synchronous speed of a motor 59.

A power source 60 is connected to the cycloconverter circuit 65 in order to provide current to motor 59 in proportion to the output signal amplitude from the sine wave reference circuit 63. In addition to providing a pulse rate proportional to the input voltage, the analog to pulse rate circuit 61 provides a polarity signal which, when applied to the sine wave reference circuit 63, determines the phase relationship or phase sequence of the power applied to the motor 59 by the cycloconverter circuit 65. Hence, a polarity change in the voltage output of the integrator 49 will cause a change in the phase sequence output of the sine wave reference circuit 63 and the cycloconverter 65 resulting in reversal of rotation of the motor 59. The magnitude of the voltage output of the integrator 49 determines the frequency of the output of the analog to pulse rate circuit 61, the sine wave reference circuit 63 and of the cycloconverter 65. From the above, it is clear that the rate of change in speed of motor 59 is dependent on the rate at which the output signal of the integrator circuit 49 changes, which, of course, depends on its input voltage. As described earlier, it is essential that the rate of change in frequency, and hence the rate of change in synchronous speed of the motor, be limited to ensure that motor speed is greater than the pullout speed ($N_{po}$) (FIG. 1) of the motor. In order to limit the maximum rate of change in frequency of the source and hence the synchronous speed of the motor, a rate clamp circuit 67 is provided.

As stated previously, the rate of integration in integrator 49 is determined by the difference in the speed reference signal from potentiometer 41 and the output signal of tachometer 57, both of which are applied to summing junction 51. The rate clamp circuit includes a resistor 69 connected to the anode of a diode 71 and the cathode of a diode 73. The cathode of the diode 71 is connected to the anode of the diode 73 and to the tachometer 57. The diodes are thus connected in a manner normally termed "back-to-back," where one diode conducts current in one direction while the other diode blocks and vice versa. The present day silicon diode has a forward voltage drop of approximately 0.7 volts. Thus, the general object of the back-to-back connected diodes 71 and 73 in conjunction with resistor 69 and tachometer 57 is to maintain a 0.7 volt maximum input signal to the integrator 49. Should the difference in voltage between the speed reference signal from potentiometer 41 and the speed feedback signal from the tachometer 57 produce a voltage at the junction of resistors 47 and 52 which exceeds the 0.7 volt level, either positively or negatively in polarity, the rate clamp circuit will maintain the input to the integrator at 0.7 volts maximum. Thus, the input to the integrator 49 is clamped at 0.7 volts, which causes an additional current proportional to the excess voltage to flow through diodes 71 of 73. This excess voltage allows the difference between the input signal voltage and 0.7 volts limit to appear across either the resistor 69 in series with the tachometer 57 or the resistor 47 in series with the speed reference potentiometer 41. Thus, with a fixed 0.7 volts supply applied to integrator 49, a fixed current will result which is applied to capacitor 53, causing this capacitor to charge at a fixed rate. With a fixed rate of charge on capacitor 53, the integrator will produce an output voltage which changes at a predetermined constant rate. The 0.7 volts supplied by the rate clamp circuit is, therefore, a maximum input signal to the integrator 49 and low level signals (signals of less than 0.7 volts) from the speed reference potentiometer 41 applied to summing junction 51 are not affected by the rate clamp circuit 67. In this case a low level difference resulting from the combination of the tachometer output and the speed reference input causes the integrator output to move at a rate which follows the existing difference between the two input signals. If, however, a very large difference, i.e. if a large instantaneous change in the output of the speed reference potentiometer 41 is applied to the integrator 49, the 0.7 volts output of the rate clamp circuit will limit the change in the integrator output to a predetermined value. This results in a limiting of the rate of change in frequency, and, of course, in the rate of change in motor torque. The level of this limit is determined by the magnitude of the resistor 52 in series with the integrator 49.

Since a motor is an inductive type device, the requirement of maintaining a constant flux density implies that the voltage level per cycle per second applied to the motor is maintained at a constant value. For example, if a motor is operated at a 440 volt level at a 60 cycles per second frequency (60 Hz) in order to obtain a desired magnetic flux density, then, if the frequency is changed to 30 cycles per second, the motor must be operated at 220 volts so that the flux density is maintained at a constant level. In the illustrated embodiment of FIG. 3, a constant volts/cycle/sec. circuit 81 is provided for maintaining a constant relationship between the frequency of the alternating current applied to the motor and the amplitude of the voltage thereof. The constant volts/cycle/sec. circuit 81 derives an input signal from the integrator circuit 49 and, as a result thereof, produces a voltage signal which, when applied to the sine wave reference circuit 63, causes the sine wave reference circuit to adjust the amplitude of its output signal accordingly. Since the output signal of integrator 49 also indirectly determines the frequency of the output signal of the sine wave reference circuit 63, it is obvious that the frequency and the amplitude of the sine wave reference circuit are adjusted simultaneously. The constant volts/cycle/sec. circuit 81 includes an operational amplifier 83, a feedback resistor 85 connected across the output and input connections of the amplifier 83 and a series resistor 87 connected between the output of integrator 49 and a summing junction 89 which in turn forms the input of the amplifier. The functions of an operational amplifier are well known to those skilled in the art and are completely described in the Amplifier Handbook (pages 19-3 through 19-38 ), McGraw-Hill Book Company by Richard H. Shea (Chief Editor), Library of Congress Card No. 64–66296. Briefly, an operational amplifier is a high gain amplifier; i.e., the ratio of output to input is very large. In the illustrated embodiment, the amplifier input is determined by the ratio of the values of the feedback resistor 85 and the input resistor 87. The function of these two resistors is to cause the input voltage to the amplifier 83 to attain a value which approaches zero. The output of the amplifier is the inverse in polarity of the input.

The output of operational amplifier 81 connects to the sine wave reference circuit 63 so that, when the voltage output of integrator 49 changes, the output of operational amplifier 81 will change inversely and cause the sine wave reference circuit to produce a change in voltage corresponding thereto. The result is a modification of the output of the sine wave reference whereby a constant voltage/cycle/second is obtained by the cycloconverter 65.

FIG. 2 shows, without regard of the frequency used, that the difference between the synchronous speed of a particular motor and the pullout speed of that motor is always a constant number of revolutions per minute, indicated by the distance between $N_{syn}$ and $N_{po}$. As load torque is increased, the actual speed of the motor will reduce. Continued increase of load torque will eventually reduce the motor speed to a point where the load torque is larger than the motor pullout torque, causing the motor to stall. Within the allowable limits, that is between synchronous speed ($N_{syn}$) and pullout speed ($N_{po}$), the load may be varied. The difference between the synchronous speed and the actual speed of the motor is termed "slip." (This differs from the conventional definition where slip is defined as the difference between synchronous speed and actual speed, divided by the synchronous speed, thus involving a normalizing factor.) Thus, knowing the synchronous speed of the motor and knowing the actual speed of the motor (feedback signal from tachometer 57), the slip can be calculated. The calculation results in a value of slip which is an indication of the difference between the speed at which the motor is operating and its synchronous speed. The value of slip is used in the regulator in order to prevent the motor slip from exceeding a value which corresponds to the pullout torque.

Figure 4:
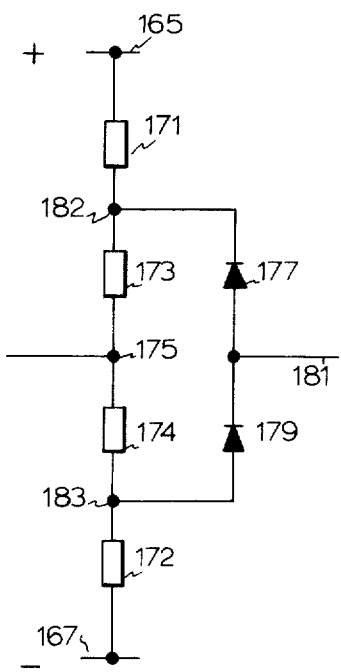
FIG. 4 shows the components employed in the slip limit circuit 99 of FIG. 3.

Refer again to FIG. 3 which shows a maximum slip circuit 91 containing an amplifier 93 which derives one input signal from the output of integrator 49 through resistor 95 and a second input signal from the tachometer 57 through a resistor 97. The function of the amplifier and input resistors is to subtract the input signals through resistor 97 and 95 from each other. Amplifier 93 has its output connected to a slip limit circuit 99, the output of which is applied through a resistor 101 to summing junction 51. The internal connections of the slip limit circuit 99 are shown in FIG. 4 and described later in this specification.

As stated earlier, the output of the integrator 49 defines frequency. Thus, frequency may be simply related to the synchronous speed of the motor so that once a value of frequency is applied to the motor there also exists a value of synchronous speed of the motor. The tachometer 57 provides a signal proportional to the actual speed of the motor. These two values are scaled or adjusted by resistors 95 and 97 making them similar units and then are subtracted in the amplifier 93. The amplifier is arranged to have one input signal applied through resistor 97 where it is inverted, while the other input signal applied through resistor 95 will remain in the normal state. The resultant output from the amplifier 93 is a voltage signal which is proportional to the difference between the synchronous speed of the motor from the integrator 49 and the actual speed of the motor from the tachometer 57. This output signal from the amplifier 93 is applied to the slip limit circuit 99. If, during a speed change, the voltage signal from the amplifier 93 reaches a value which is equivalent to the pullout speed of the motor, the input to integrator 49 must be held to a zero value in order to prevent the frequency of the cycloconverter output applied to motor 59 from changing further until such time as the motor has returned to within its operating range (box 25 — FIG. 1). In other words, should the slip approach a value which would cause the actual speed of the motor to be equal to its pullout speed, then the slip limit circuit, under the influence of the output of amplifier 93, will produce a signal which will prevent the integrator from changing its output as fast as the rate clamp circuit 67 will allow it to change. The maximum slip circuit 91, therefore, is not effective until the motor is required to develop more torque than the pullout torque. At that point, the slip limit circuit functions and reduces the rate at which the frequency of the alternating current applied to the motor can be changed.

A circuit 121, titled "volts/cycle/second compensation," is provided to increase the voltage applied to the motor 59 enough to compensate for and overcome the voltage drop across the rotor resistance and the rotor reactance when load applied to the motor is increased. It should be noted that as load increases, slip increases. Slip may, therefore, be used to change the voltage level applied to the motor in order to compensate for the additional slip. It is also possible to overcompensate slightly whereby a gain in the output of the motor is achieved. This gain may be in excess of the ordinary designed output level of the motor. It is possible under certain circumstances to overexcite the motor by as much as 50 percent for a short duration to achieve a high performance drive and allow motor reversal or speed change in the least possible time. This is the general principle and function of the volts/cycle/second compensation circuit 121 which not only provides compensation as load increases but also provides overcompensation so that at the pullout torque point the motor will be overexcited. The volts/cycle/second compensation circuit 121 comprises an inverting amplifier 123, a feedback resistor 125, connected between the output and the input of the amplifier, and a series input resistor 127 connected to the input of amplifier 123 for receiving the output signal from the amplifier 93 of the maximum slip circuit 91. The signal derived from the amplifier 93 represents slip (the difference between the synchronous speed of the motor and the actual speed thereof).

If the signal derived from the amplifier 93 is positive in polarity, it is also directed through a diode 129 and through resistor 131 to the summing junction 89. The input of sine wave reference circuit 63 is thereby adjusted proportionally. It is noted that the signal derived from amplifier 93 is positive when the synchronous speed of the motor is greater than the actual speed. There is also the possibility that synchronous speed could be less than the motor speed, a condition which prevails when the load drives the motor, such as may occur in a crane when a large load is lowered. If the synchronous speed is less than the motor speed, the amplifier 93 produces a negative output signal which is applied through resistor 127 to the inverting amplifier 123. This inverting amplifier produces a positive signal which is applied to the summing junction 89 through diode 132 and resistor 131. Thus, the signal applied to summing junction 89 representing the difference between the synchronous speed and the actual speed of the motor, is always positive without regard to the relationship between the synchronous speed and the actual speed of the motor. The positive signal raises the input to the sine wave reference circuit 63, causing the cycloconverter circuit 65 to increase the excitation to motor 59.

FIG. 4 shows the internal components of the slip limit circuit 99 of FIG. 3. Four resistors, 171-174, are connected in series having a center connection 175 at the junction of resistors 173 and 174. The junction between resistors 171 and 173 connects to the cathode of a diode 177. Similarly, the junction of resistors 172 and 174 connects to the anode of a diode 179. The cathode of diode 179 connects to the anode of diode 177 and forms the output connection 181 of the slip limit circuit.

A positive bus 165 supplies a voltage through a resistor 171 to a resistor 173 and the cathode of a diode 177. A negative bus 167 supplies voltage through a resistor 172 to the anode of diode 179 and a resistor 174. Resistors 173 and 174 are connected together and their junction point 175 forms an input connection to the slip limit circuit.

Resistors 171 and 172 have impedance values which are high with respect to the impedance value of resistors 173 and 174. The combination of resistors 171-174 and the positive and negative buses 165 and 167 produce a constant current through resistors 173 and 174. Without an input signal applied to the slip limit circuit, point 175 is at zero potential and no output signal is produced since the positive current is blocked by diode 177 and the negative current is blocked by diode 179. A positive potential of low value, for example 1 volt, exists at the junction point 182 between resistors 171 and 173. Similarly, a negative potential also of 1 volt exists at the junction point 183 between resistors 172 and 174.

Assume now that a positive input signal of less than 1 volt is applied to point 175. This signal cannot produce current through resistor 173 since the positive potential at point 182 is 1 volt. Therefore, the signal current through resistor 174 is opposed by a negative 1 volt potential existing at point 183. No current will flow through diode 179 since the potential at point 183 is negative with respect to point 182, causing diode 179 to be reverse biased.

If now, for example, the input signal is positive and has a magnitude greater than 1 volt, point 183 will become positive with respect to the output connection at point 181 and current will flow through diode 179, hence the circuit will produce and output signal.

Similarly, it the input signal is negative and in excess of 1 volt, point 175 will become negative and current will flow from the output connection 181 through diode 177, hence the circuit will produce an output signal. The input voltage must exceed the voltage drop created by the impedance of resistors 173 and 174, which in the above-described operational details was arbitrarily selected at 1 volt before an output signal is produced. The slip limit circuit is designed to provide no output voltage when the slip of the motor is within predetermined limits, that is, between the synchronous speed and the pullout speed of the motor. In other words, the circuit has no effect on the output frequency of the control as long as the slip remains within the above-said limits.

In FIG. 3, the regulator interface circuit 62 is shown to include the analog to pulse rate circuit 61, the sine wave reference circuit 63 and cycloconverter circuit 65 to produce a variable frequency polyphase alternating current supply to motor 59. The voltage level of the thus produced alternating current and its frequency are constantly regulated by the system comprising the rate clamp circuit 67, the maximum slip circuit 91, the constant volts/cycle/second circuit 81 and the volts/cycle/second compensation circuit 121. The circuitry shown provides a means for regulating the speed of a polyphase induction motor over a range of 1,000:1 or greater. Under less demanding conditions, there are many interface circuit designs available which may be substituted for the interface circuit 62 in FIG. 3. One of the more commonly used circuits is, for example, the oscillator and amplifier circuit 201 shown in FIG. 5.

Figure 5:
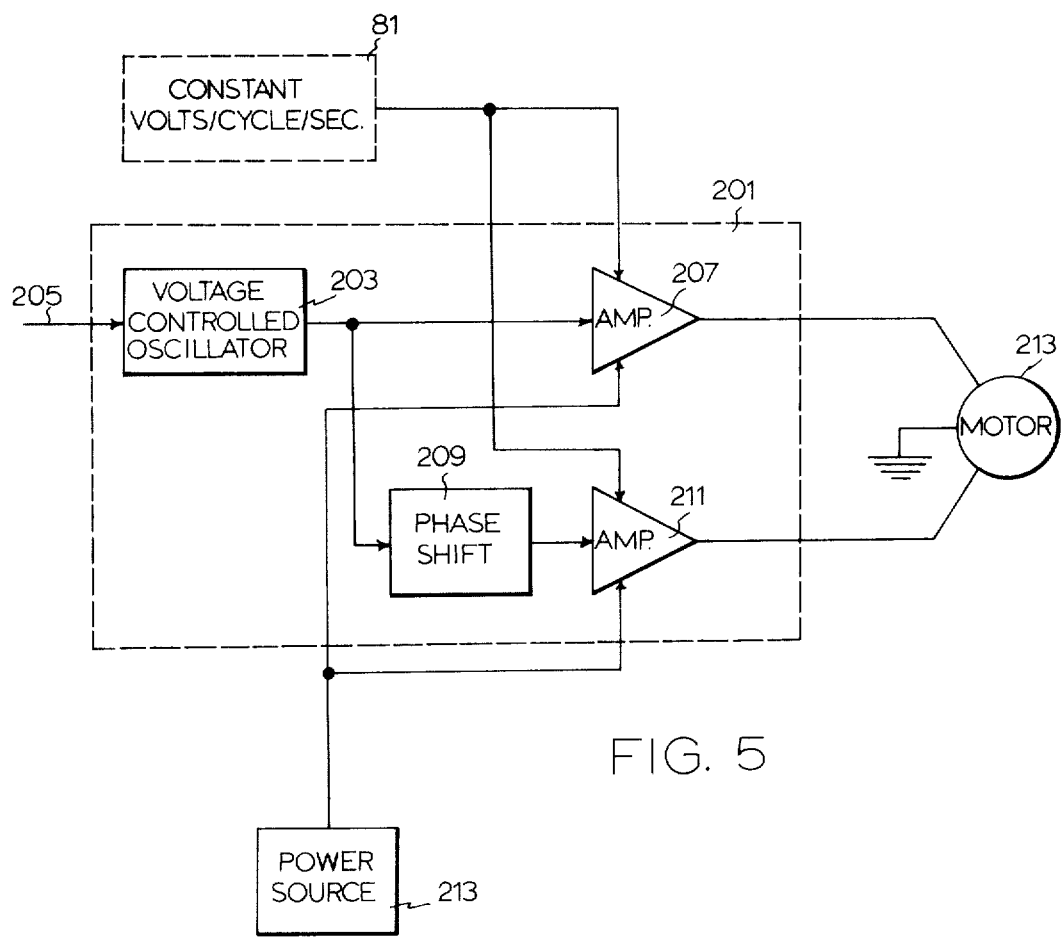
FIG. 5 shows a circuit of an alternative method for providing a variable frequency alternating current for regulating the speed of a polyphase induction motor.

FIG. 5 shows, but is not limited to, a two-phase circuit 201 which includes a voltage controlled oscillator receiving a voltage signal from integrator 49 in FIG. 3 through an input 205. The oscillator produces a reference waveshape of alternating polarity, the frequency of which is proportional to the input voltage level. The output waveshape is applied to a power amplifier 207 and a phase shift circuit 209. In the two-phase circuit, phase shift circuit 209 produces a 90° shift relative to its input frequency and applies this output waveshape to a second amplifier 211. The two amplifiers amplify the output of the voltage controlled oscillator 203 to a power level required by motor 213. Motor 213 is of the induction type similar to motor 59 in FIG. 3, the synchronous speed of which is directly proportional to the frequency applied to its input terminals so that the frequency of the output waveshape produced by the voltage controlled oscillator 203 determines the synchronous speed of the motor. Since the frequency of the output waveshape of the voltage controlled oscillator 203 is a function of the input voltage thereof, the synchronous speed of the motor is controlled by the voltage level at input 205 of the voltage controlled oscillator 203.

Similarly to interface circuit 62, FIG. 3, the voltage applied to the motor by interface circuit 201, FIG. 5, must be regulated as a function of frequency. This function is performed by the constant volts/cycle/second circuit 81 shown in FIG. 3. The output signal produced by this circuit is applied to the amplifiers 207 and 211, whereby the gain, or the ratio of output voltage over input voltage, is adjusted with the changes in frequency.

All other functions, such as those provided by the maximum slip circuit 91 and volts/cycle/second compensation circuit 121 of which the output signals are applied to the summing junction 89 of the constant volts/cycle/second circuit 81, adjust the gain of the amplifiers 207 and 211. A power source 213 in FIG. 5, similar to the power source 60 in FIG. 5, provides power to the amplifiers 207 and 211 causing these amplifiers to provide alternating current which is applied to the motor 213 at a rate which coincides with the design of the motor.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A speed control for use with an induction motor, comprising a. means for producing a reference signal proportional to motor speed desired; b. means for producing a feedback signal proportional to actual motor speed; c. means responsive to said reference signal and said feedback signal for producing an output signal proportional to the time integral of the algebraic sum of said reference and feedback signals; d. means responsive to said output signal for developing a control signal the frequency of which is proportional to the magnitude of said output signal; e. means for adjusting the amplitude of said control signal in response to said output signal in a manner such that the volts per cycle per second of said control signal is substantially constant; f. means for measuring the level of slip of the motor, and for producing a limit signal when the slip has reached a predetermined value, said limit signal acting to modify the value of said output signal; and g. means for applying a signal proportional to said control signal to said motor for controlling the speed thereof.

2. The invention claimed in Claim 1 further including means for limiting the rate of change of the frequency of said control signal.

3. The invention claimed in Claim 1 wherein said means for measuring the slip of the motor and for producing said limit signal comprises
   a. means for producing a slip signal proportional to the difference between said output signal and said feedback signal; and
   b. means for determining when said slip signal exceeds a predetermined value representing the maximum allowable slip of the motor.

4. The invention claimed in claim 3 further including means for further adjusting the amplitude of the control signal as a function of the magnitude of said slip signal.

5. The invention claimed in claim 1 further including means for reversing the direction of rotation of the motor as a function of the polarity of said output signal.

6. The invention claimed in claim 1 wherein the last recited means includes means to amplify said control signal.

* * * * *